US012731917B1

(12) United States Patent
Klein et al.

(10) Patent No.: US 12,731,917 B1
(45) **Date of Patent: *Sep. 8, 2026**

(54) SOLDERLESS WIRE CONNECTOR

(71) Applicant: Titan3 Technology LLC, Tempe, AZ (US)

(72) Inventors: John E. Klein, Chandler, AZ (US); Jeffrey P. Baldwin, Anthem, AZ (US)

(73) Assignee: Titan3 Technology LLC, Tempe, AZ (US)

( * ) Notice: Subject to any disclaimer, the term of this patent is extended or adjusted under 35 U.S.C. 154(b) by 19 days.

This patent is subject to a terminal disclaimer.

(21) Appl. No.: 18/667,332

(22) Filed: May 17, 2024

Related U.S. Application Data

(63) Continuation of application No. 17/838,112, filed on Jun. 10, 2022, now Pat. No. 12,003,068, which is a continuation-in-part of application No. 17/695,775, filed on Mar. 15, 2022, now Pat. No. 11,881,668, which is a continuation of application No. 16/887,610, filed on May 29, 2020, now Pat. No. 11,276,945.

(51) Int. Cl.
*H01R 4/22* (2006.01)

(52) U.S. Cl.
CPC .................................... *H01R 4/22* (2013.01)

(58) Field of Classification Search
CPC ...................................................... H01R 4/22
See application file for complete search history.

(56) References Cited

U.S. PATENT DOCUMENTS

| | | | |
|---|---|---|---|
| 3,519,707 | A | 7/1970 | Krup |
| 5,001,301 | A | 3/1991 | Marr |
| 6,677,530 | B2 | 1/2004 | Blaha |
| D523,821 | S | 6/2006 | Michaud |
| 7,365,270 | B2 | 4/2008 | Michaud |
| 11,276,945 | B1 | 3/2022 | Klein |
| 11,881,668 | B1 | 1/2024 | Klein |
| 12,003,068 | B1 | 6/2024 | Klein |
| 2009/0283293 | A1 | 11/2009 | Hiner |

OTHER PUBLICATIONS

Twister® ProFLEX™ Wire Connector, Model 347 Red/Yellow: https://idealind.com/shop/twister-proflex-347-box-of-50.html.

*Primary Examiner* — Chau N Nguyen
(74) *Attorney, Agent, or Firm* — Kenneth C. Booth; Booth Udall, PLC

(57) ABSTRACT

A wire connector that has a body with a closed end and an open end, a wire cavity within the open end, and a plurality of grip assemblies positioned around the body. The wire cavity is configured to rotatably couple to one or more wires. Each of the grip assemblies may have a raised rib extending between the closed end and the open end, a groove extending into the raised rib, and a rib cap shaped and positioned to cover the raised rib and extend into the groove. A first end of the rib cap may be adjacent the open end of the body and a second end of the rib cap may be adjacent the closed end of the body. The second end of the rib cap of each grip assembly may be joined to an end cap positioned to cover the closed end of the body.

20 Claims, 17 Drawing Sheets

SOLDERLESS WIRE CONNECTOR

CROSS REFERENCE TO RELATED APPLICATIONS

This application is a continuation of U.S. Utility patent application Ser. No. 17/838,112 entitled "Solderless Wire Connector" to John E. Klein et al., that was filed on Jun. 10, 2022 and issues as US Utility Patent Registration No. 12,003,068 on Jun. 4, 2024, which is a continuation-in-part of U.S. Utility patent application Ser. No. 17/695,775 entitled "Solderless Wire Connector" to John E. Klein et al. that was filed on Mar. 15, 2022, now U.S. Pat. No. 11,881, 668, issued on Jan. 23, 2024, which is a continuation of U.S. Utility patent application Ser. No. 16/887,610 entitled "Solderless Wire Connector" to John E. Klein et al. that was filed on May 29, 2020, and issued as U.S. Pat. No. 11,276,945 on Mar. 15, 2022, the disclosures of all of which are hereby incorporated herein by reference.

TECHNICAL FIELD

Aspects of the present disclosure relate generally to wire connectors, also called wire nuts or wire caps, that are twisted on to one or more wires to protect the end of the wire or electrically couple two or more wires.

BACKGROUND

Wire connectors are known in the industry for electrically coupling wires. Wire connectors are generally formed of a plastic housing and include a tapered, conductive inner connector, often a spring or inwardly threaded receiver, that grips the bare ends of a wire onto which it is rotatably connected. Often, wire connectors are formed with ridges and grooves, or outwardly extending wings to assist a user in gripping the wire connector while twisting it on to the wire(s).

SUMMARY

Aspects of this disclosure relate to a wire connector comprising a body having an axis, a closed end, and an open end, wherein the body is divided into an upper portion adjacent the closed end and a lower portion adjacent the open end and the lower portion is joined to the upper portion by an annular shelf angled toward the axis, a wire cavity within the open end of the body configured to rotatably couple to one or more wires, a plurality of grip assemblies positioned around a circumference of the body, each of the grip assemblies comprising: a raised rib extending between the closed end and the open end, a groove extending radially into the raised rib, wherein the groove is parallel with the raised rib, a rib cap shaped and positioned to cover the raised rib and extend into the groove, the rib cap having a first end adjacent the open end of the body and a second end adjacent the closed end of the body, and a base extending radially away from the body adjacent the open end of the body, the base configured to cover the first end of the rib cap, wherein the second end of the rib cap of each grip assembly is joined to an end cap positioned to cover the closed end of the body, and at least two leverage wings extending outward from the body on opposing sides of the body, wherein an upper section of each leverage wing extends from the upper portion of the body and a lower section of each leverage wing extends from the lower portion of the body, and wherein each leverage wing of the at least two leverage wings has a wing cap positioned to cover a portion of a first side of the leverage wing and leave a second side of the leverage wing exposed.

Particular embodiments may comprise one or more of the following features. Each rib cap, each wing cap, and the end cap may be formed as one piece. Each rib cap, each wing cap, and the end cap may be formed from a material more flexible than a material of the body.

Aspects of this disclosure relate to a wire connector comprising a body having an axis, a closed end, and an open end, a wire cavity within the open end of the body configured to rotatably couple to one or more wires, and a plurality of grip assemblies positioned around a circumference of the body, each of the grip assemblies comprising: a raised rib extending between the closed end and the open end, a groove extending into the raised rib, wherein the groove is parallel with the raised rib, and a rib cap shaped and positioned to cover the raised rib and extend into the groove, the rib cap having a first end adjacent the open end of the body and a second end adjacent the closed end of the body, wherein the second end of the rib cap of each grip assembly is joined to an end cap positioned to cover the closed end of the body.

Particular embodiments may comprise one or more of the following features. The body may be divided into an upper portion adjacent the closed end and a lower portion adjacent the open end and the lower portion is joined to the upper portion by an annular shelf angled toward the axis. Each grip assembly may further comprise a base extending radially away from the body adjacent the open end of the body, the base configured to cover the first end of the rib cap. At least two leverage wings extending outward from the body on opposing sides of the body, wherein each leverage wing of the at least two leverage wings has a wing cap positioned to cover a portion of a first side of the leverage wing and leave a second side of the leverage wing exposed. The body may be divided into an upper portion adjacent the closed end and a lower portion adjacent the open end, wherein the lower portion is joined to the upper portion by an annular shelf angled toward the axis, and wherein an upper section of each leverage wing extends from the upper portion of the body and a lower section of each leverage wing extends from the lower portion of the body. Each rib cap and the end cap may be formed as one piece. Each rib cap and the end cap may be formed from a material more flexible than a material of the body.

Aspects of this disclosure relate to a wire connector comprising a body having a closed end and an open end, a wire cavity within the open end of the body configured to rotatably couple to one or more wires, and a plurality of grip assemblies coupled to the body, each of the grip assemblies comprising a raised rib extending between the closed end and the open end, a groove extending into the raised rib, and a rib cap shaped and positioned to cover the raised rib and extend into the groove.

Particular embodiments may comprise one or more of the following features. The plurality of grip assemblies may be positioned around a circumference of the body. The groove of each grip assembly may be arranged parallel with the raised rib of each grip assembly. The rib cap of each grip assembly has a first end adjacent the open end of the body and a second end adjacent the closed end of the body and wherein the second end of the rib cap of each grip assembly is joined to an end cap positioned to cover the closed end of the body. Each rib cap and the end cap may be formed as one piece. Each rib cap may be formed from a material more flexible than a material of the body. The rib cap of each grip assembly has a first end adjacent the open end of the body and a second end adjacent the closed end of the body and wherein each grip assembly further comprises a base extending radially away from the body adjacent the open end of the body, the base configured to cover the first end of the rib cap. The body may be divided into an upper portion adjacent the closed end and a lower portion adjacent the open end and the lower portion is joined to the upper portion by an annular shelf. At least two leverage wings extending outward from the body on opposing sides of the body, wherein each leverage wing of the at least two leverage wings has a wing cap positioned to cover a portion of a first side of the leverage wing and leave a second side of the leverage wing exposed. The body may be divided into an upper portion adjacent the closed end and a lower portion adjacent the open end, wherein the lower portion is joined to the upper portion by an annular shelf, and wherein an upper section of each leverage wing extends from the upper portion of the body and a lower section of each leverage wing extends from the lower portion of the body.

According to an aspect of the disclosure a wire connector may comprise an outer shell comprising a closed first end and an open second end, a wire cavity within the outer shell configured to rotatably couple to one or more wires, a plurality of raised ribs on the surface of the outer shell, each of the raised ribs defining a channel between the raised rib and an adjacent raised rib, each of the raised ribs comprising an outer surface at the top of each channel, side walls extending from the top of each channel to a bottom of each channel, and a bottom wall connecting the side walls of each raised rib and each adjacent raised rib, and a plurality of rib caps overmolded on to the top surface of each of the plurality of raised ribs, the plurality of rib caps comprising a gap between the rib cap corresponding to each of the raised ribs and the rib cap corresponding to each adjacent raised rib.

Particular embodiments may comprise one or more of the following features. E each of the raised ribs and each of the channels may extend from adjacent the closed first end to a respective terminal end of each raised rib and channel closer the open second end than to the closed first end, the wire connector further comprising an annular base between the terminal ends of the channels and the open second end, the annular base being frustoconical in shape and having a height. The annular base may comprise a smooth surface except for a raised texture on the smooth surface. The raised texture may comprise a plurality of elliptical grip bumps extended outward from the smooth surface of the annular base and spaced about the annular base. The raised texture may comprise a plurality of rectangular grip bumps extended outward from the smooth surface of the annular base and spaced about the annular base. The raised texture may comprise a plurality of elongated rib grip bumps extending outward from the smooth surface of the annular base and spaced about the annular base. Two or more leverage wings extending outward from the outer shell on opposing sides of the outer shell between the first end and the second end. Each of the two leverage wings may comprise a first side and a second side, and a wing rib overmolded on a portion of the first side of each of the leverage wings. A wire skirt overmolded on to the second end of the outer shell, surrounding the open second end, and extending away from the open second end, the wire skirt and plurality of rib caps formed of a material more flexible than a material used to form the outer shell.

According to an aspect of the disclosure, a wire connector may comprise an outer shell comprising a closed first end and an open second end, a wire cavity within the outer shell configured to rotatably couple to one or more wires, a plurality of raised ribs on the surface of the outer shell, each of the raised ribs defining a channel between the raised rib and an adjacent raised rib, each of the raised ribs comprising an outer surface at the top of each channel, side walls extending from the top of each channel to a bottom of each channel, and a bottom wall connecting the side walls of each raised rib and each adjacent raised rib, a plurality of rib caps overmolded on to the top surface of each of the plurality of raised ribs, the plurality of rib caps comprising a gap between the rib cap corresponding to each of the raised ribs and the rib cap corresponding to each adjacent raised rib, two leverage wings extending outward from the outer shell on opposing sides of the outer shell between the first end and the second end, and a wire skirt overmolded on to the second end of the outer shell, surrounding the open second, end and extending away from the open second end, the wire skirt and plurality of rib caps formed of a material more flexible than a material used to form the outer shell.

Particular embodiments may comprise one or more of the following features. Each of the two leverage wings may comprise a first side and a second side, and a wing rib overmolded on to a portion of the first side of each of the leverage wings. Each of the two leverage wings may further comprise a wing rib overmolded on to a portion of the first side of each of the leverage wings but not on to any of the second side of each of the leverage wings. A base adjacent the open second end, the base at least partially having a frustoconical shape and having a height. The base may comprise a smooth surface except for a raised texture on the smooth surface. The raised texture may comprise a plurality of elongated rib grip bumps extending outward from the smooth surface of the base and spaced about the base. A plurality of elongated rib grip bumps may extend outward from a surface of the base and spaced about the base.

The foregoing and other aspects, features, applications, and advantages will be apparent to those of ordinary skill in the art from the specification, drawings, and the claims. Unless specifically noted, it is intended that the words and phrases in the specification and the claims be given their plain, ordinary, and accustomed meaning to those of ordinary skill in the applicable arts. The inventors are fully aware that he can be his own lexicographer if desired. The inventors expressly elect, as their own lexicographers, to use only the plain and ordinary meaning of terms in the specification and claims unless they clearly state otherwise and then further, expressly set forth the "special" definition of that term and explain how it differs from the plain and ordinary meaning. Absent such clear statements of intent to apply a "special" definition, it is the inventors' intent and desire that the simple, plain and ordinary meaning to the terms be applied to the interpretation of the specification and claims.

The inventors are also aware of the normal precepts of English grammar. Thus, if a noun, term, or phrase is intended to be further characterized, specified, or narrowed in some way, then such noun, term, or phrase will expressly include additional adjectives, descriptive terms, or other modifiers in accordance with the normal precepts of English grammar. Absent the use of such adjectives, descriptive terms, or modifiers, it is the intent that such nouns, terms, or phrases be given their plain, and ordinary English meaning to those skilled in the applicable arts as set forth above.

Further, the inventors are fully informed of the standards and application of the special provisions of 35 U.S.C. § 112(f). Thus, the use of the words "function," "means" or "step" in the Detailed Description or Description of the Drawings or claims is not intended to somehow indicate a desire to invoke the special provisions of 35 U.S.C. § 112(f), to define the invention. To the contrary, if the provisions of 35 U.S.C. § 112(f) are sought to be invoked to define the inventions, the claims will specifically and expressly state the exact phrases "means for" or "step for", and will also recite the word "function" (i.e., will state "means for performing the function of [insert function]"), without also reciting in such phrases any structure, material or act in support of the function. Thus, even when the claims recite a "means for performing the function of . . . " or "step for performing the function of . . . ," if the claims also recite any structure, material or acts in support of that means or step, or that perform the recited function, then it is the clear intention of the inventors not to invoke the provisions of 35 U.S.C. § 112(f). Moreover, even if the provisions of 35 U.S.C. § 112(f) are invoked to define the claimed aspects, it is intended that these aspects not be limited only to the specific structure, material or acts that are described in the preferred embodiments, but in addition, include any and all structures, materials or acts that perform the claimed function as described in alternative embodiments or forms of the disclosure, or that are well known present or later-developed, equivalent structures, material or acts for performing the claimed function.

The foregoing and other aspects, features, and advantages will be apparent to those of ordinary skill in the art from the specification, drawings, and the claims.

BRIEF DESCRIPTION OF THE DRAWINGS

Implementations will hereinafter be described in conjunction with the appended drawings, where like designations denote like elements, and.

Figure 1:
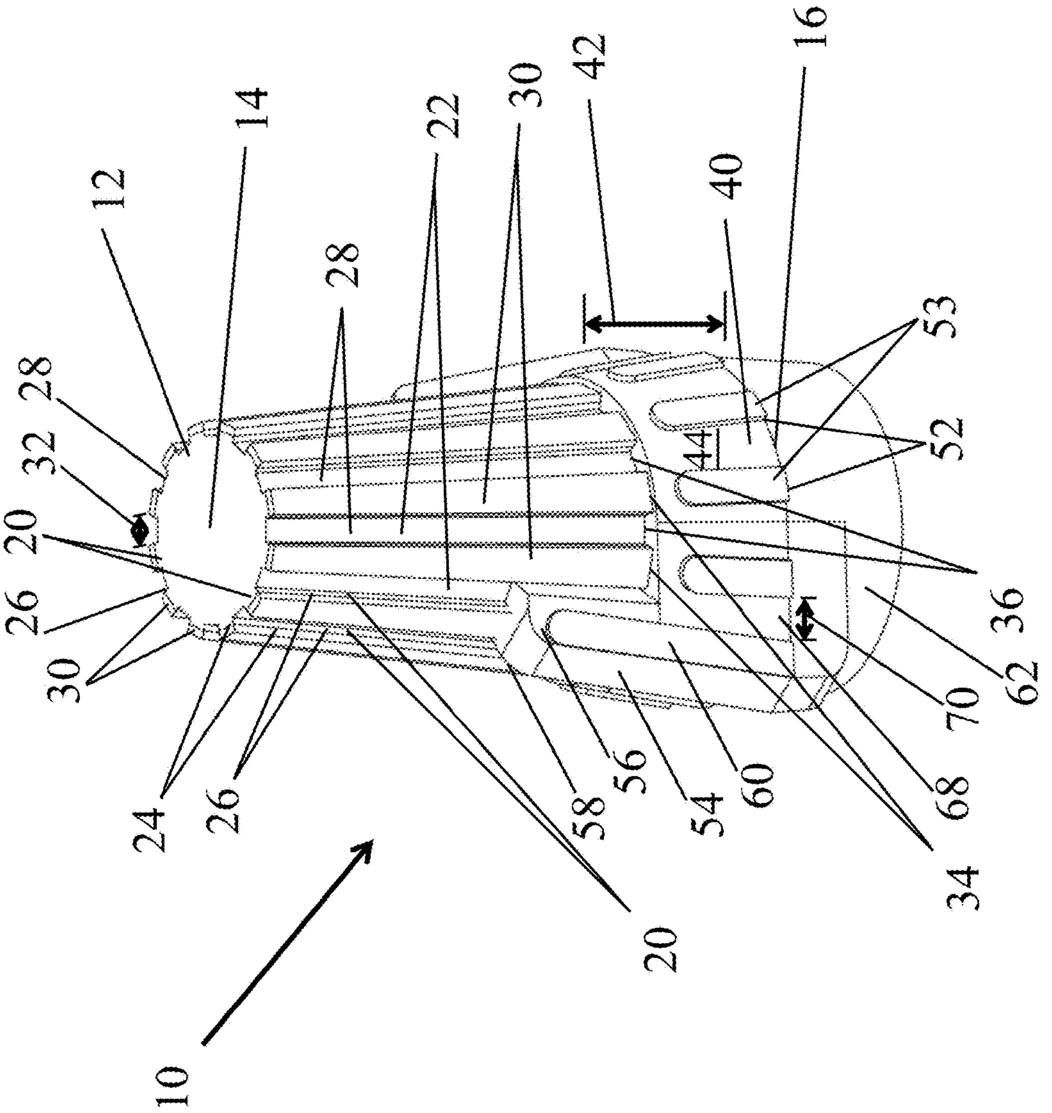
FIG. 1 is a perspective view of a wire connector with coated grip ribs.
Figure 3:
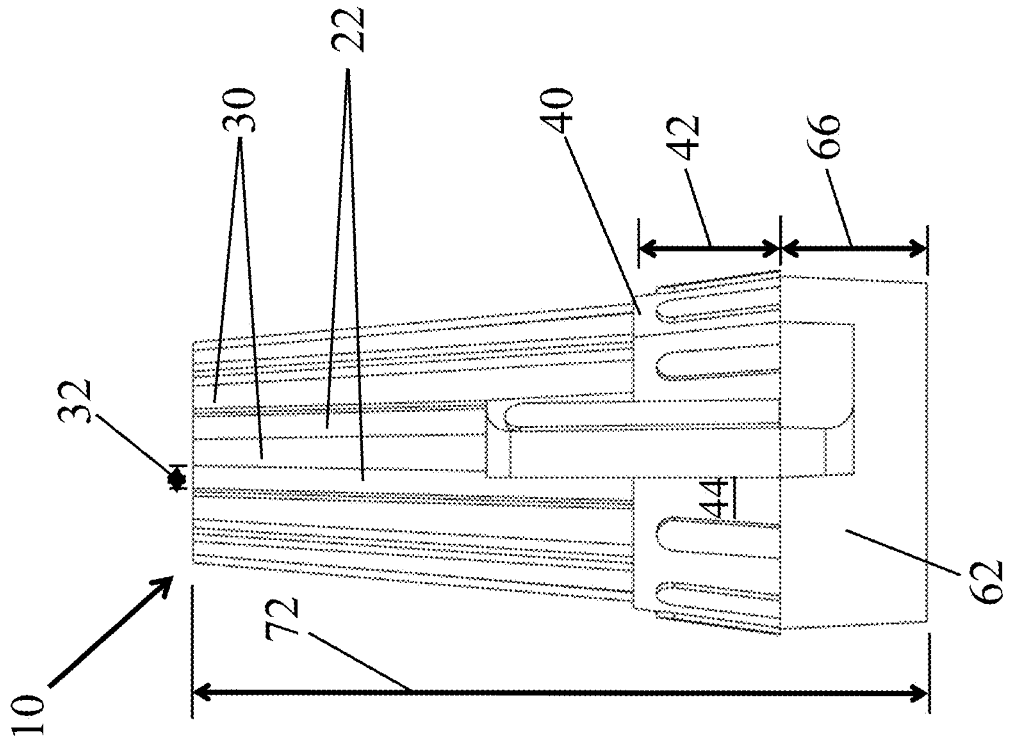
FIG. 3 is a side view of the wire connector of FIG. 1.
Figure 2:
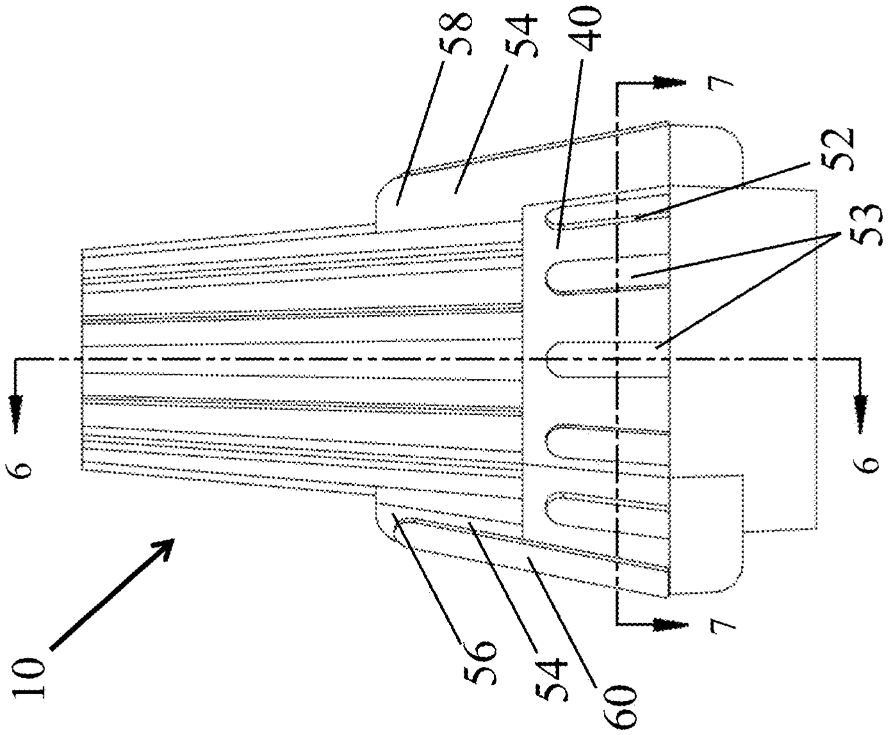
FIG. 2 is a front view of the wire connector of FIG. 1.
Figure 5:
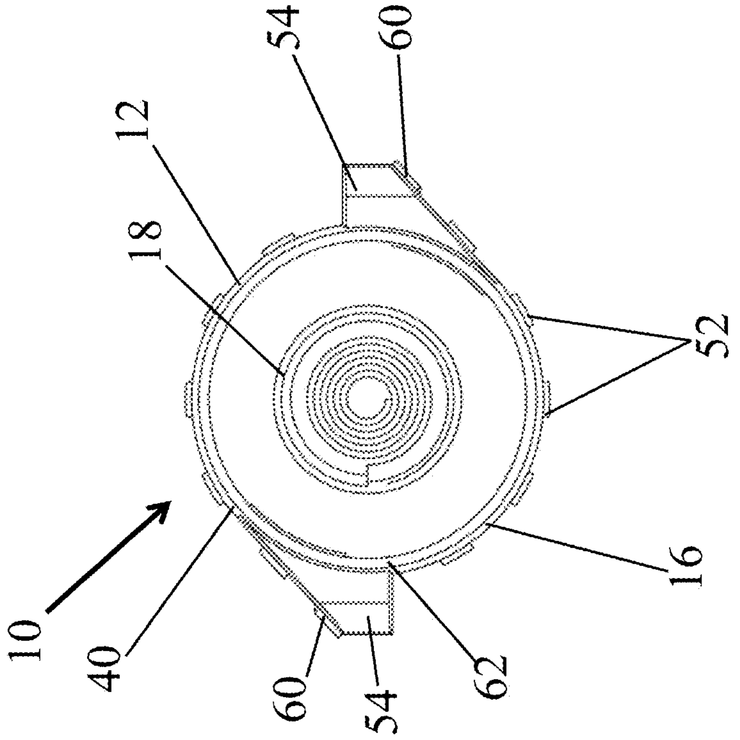
FIG. 5 is a bottom view of the wire connector of FIG. 1.
Figure 4:
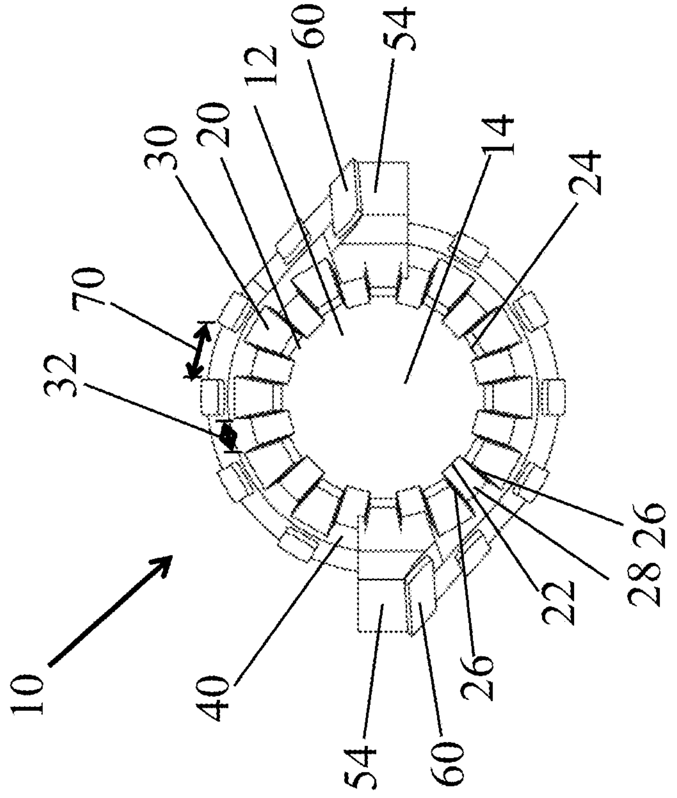
FIG. 4 is a top view of the wire connector of FIG. 1.
Figure 6:
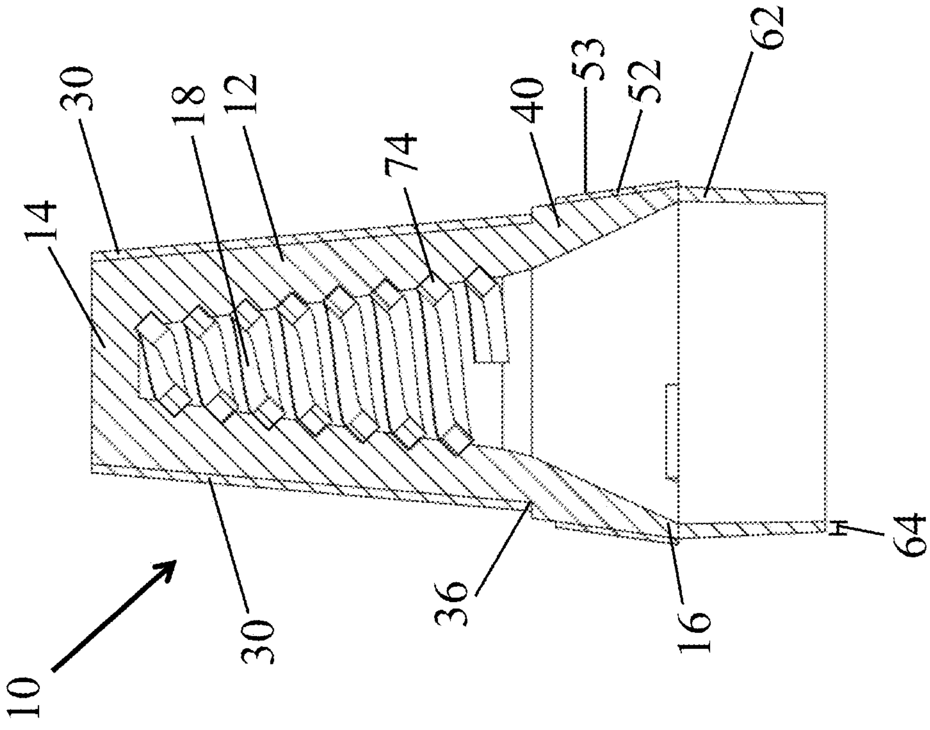
FIG. 6 is a cross-sectional view of the wire connector of FIG. 1 taken along section lines 6-6 of FIG. 2.
Figure 7:
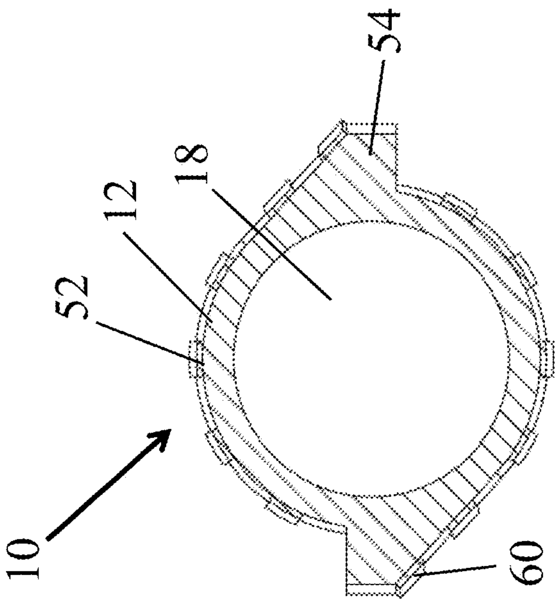
FIG. 7 is a cross-sectional view of the wire connector of FIG. 1 taken along section lines 7-7 of FIG. 2.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of implementations.

DETAILED DESCRIPTION

In the following description, reference is made to the accompanying drawings which form a part hereof, and which show by way of illustration possible implementations. It is to be understood that other implementations may be utilized, and structural, as well as procedural, changes may be made without departing from the scope of this document. As a matter of convenience, various components will be described using exemplary materials, sizes, shapes, dimensions, and the like. However, this document is not limited to the stated examples and other configurations are possible and within the teachings of the present disclosure. As will become apparent, changes may be made in the function and/or arrangement of any of the elements described in the disclosed exemplary implementations without departing from the spirit and scope of this disclosure.

FIGS. 1-7 illustrate a particular embodiment of a wire connector 10 with an outer shell 12 typically formed of a substantially rigid plastic or some other insulative material, such as polypropylene, having a closed first end 14 and an open second end 16. The outer shell 12 may be formed of any material which is known in the art for forming wire connectors. A wire cavity 18 is included within the outer shell 12 that may narrow as the wire cavity 18 nears the closed first end 14. The cavity is configured to rotatably couple to one or more wires when the wire connector 10 is twisted on to the wire(s). To rotatably couple to the wire(s), the internal cavity may include an internally threaded surface, or a spring, such as a square cross-section spring 74 (FIG. 6) or other metallic component with a pitched internal surface that narrows toward the closed first end so that as the wire connector 10 is twisted onto the wire(s), the surface draws the wire(s) toward the closed first end to retain the wire(s) within the wire cavity 18.

On an outer surface of the outer shell 12, a plurality of raised ribs 20 are included that extend between the first end 14 and the second end 16 of the outer shell 12. The plurality of raised ribs 20 define a plurality of channels 22 between each adjacent raised rib 20. The plurality of channels 22 extend substantially parallel to the plurality of raised ribs 20. Each raised rib 20 includes a top surface 24 extending the length of the raised rib 20 to its terminal end 34, and each channel 22 includes side walls 26 and a bottom wall 28 extending the length of the channel 22 to its terminal end 36.

A rib cap 30 is positioned on the top surface 24 of each raised rib 20. The rib caps 30 are formed of a material more flexible than the material which the outer shell 12 is formed of. In a particular embodiment, the rib caps 30 are overmolded onto the raised ribs 20 of the outer shell 12 using standard overmolding processes used for overmolding materials onto selective areas of plastic. The overmolding materials for the rib caps 30 found advantageous for providing enhanced grip includes any of rubber, silicone, urethane, synthetic rubbers and fluoropolymer elastomers such as those manufactured by DuPont® under the trademark Viton®, ethylene propylene diene monomer (EPDM) rubber, and thermoplastic elastomers such as neoprene and santoprene. It has been found that applying a rib cap 30 having a thickness of between 0.010"-0.025" works well.

Each of the rib caps 30 has a gap 32 between one rib cap 30 and an adjacent rib cap 30 so that the bottom wall of the channels 22 does not include overmolded materials and leaves the substantially rigid material used to form the outer shell 12 exposed within the channel. It will be understood by those of ordinary skill in the art that due to overmolding process realities, there may be some extension of the overmolded material of the rib caps 30 beyond just the top surface 24 of the raised ribs 20 so that a portion of the side walls 26 of the channels 22 may include some overmolded material, though a majority of the side walls 26 is left bare overmolded materials and exposed. The inclusion of a gap 32 between the rib caps 30, gives an added advantage over completely overmolding the material into the channels. By including a gap 32, a portion of the channel the side walls 26 is exposed so that when a user applies a twisting force to the wire connector with the user's fingers, the rib cap 30 material compresses comfortably and if additional force is needed, the user's fingers will compress the rib cap 30 material to a point where the user's fingers contact the substantially rigid, and less flexible material of the outer shell 12 within the gaps 32 by contacting the side walls 26 of the channels 22 to allow for a more rigid grip without the more flexible rib caps 30 preventing access to the channel side walls 26 when it is needed. If there is no gap, the user's fingers, which may be contaminated with sweat or moisture or other materials causing them to slip on the rib cap 30 overmolded material, may slip and be unable to easily maintain the gripping force needed to engage or disengage the wire connector 10 from the wires to which it is attached. Thus, when it is needed, the inclusion of gaps 32 gives user fingers the comfort of the overmolded material with an enhanced grip over completely overmolded surfaces.

Figure 9:
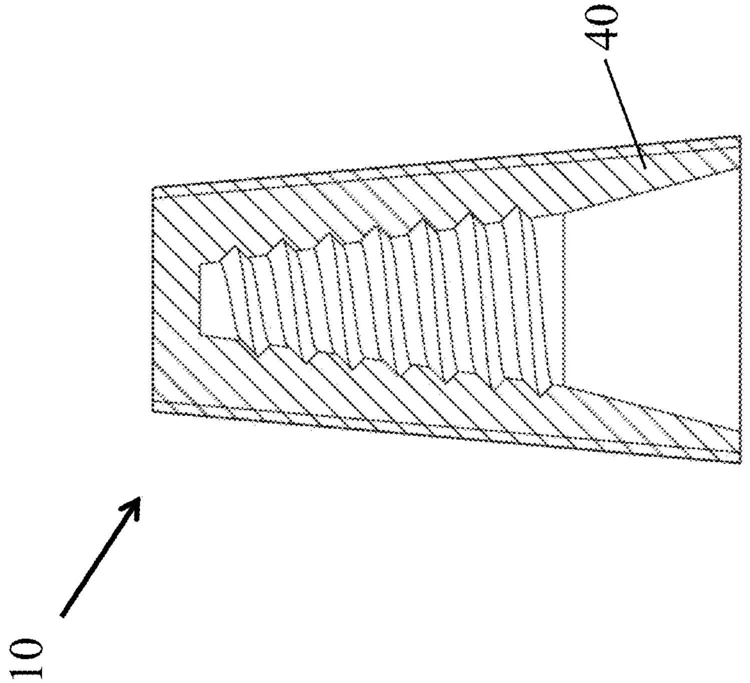
FIG. 9 is a cross section view similar to FIG. 6, but of the wire connector of FIG. 8.
Figure 8:
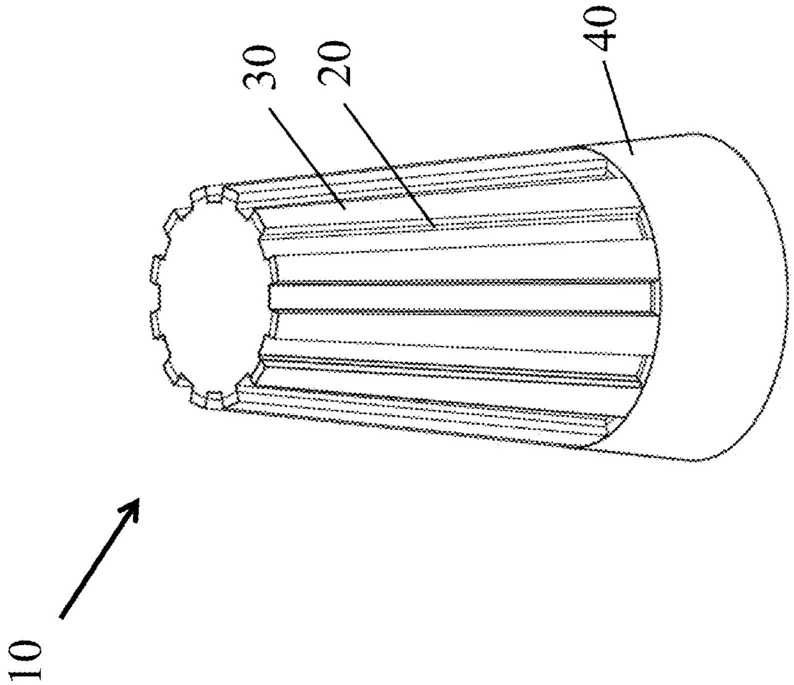
FIG. 8 is a perspective view of a wire connector with coated grip ribs and base.
Figure 11:
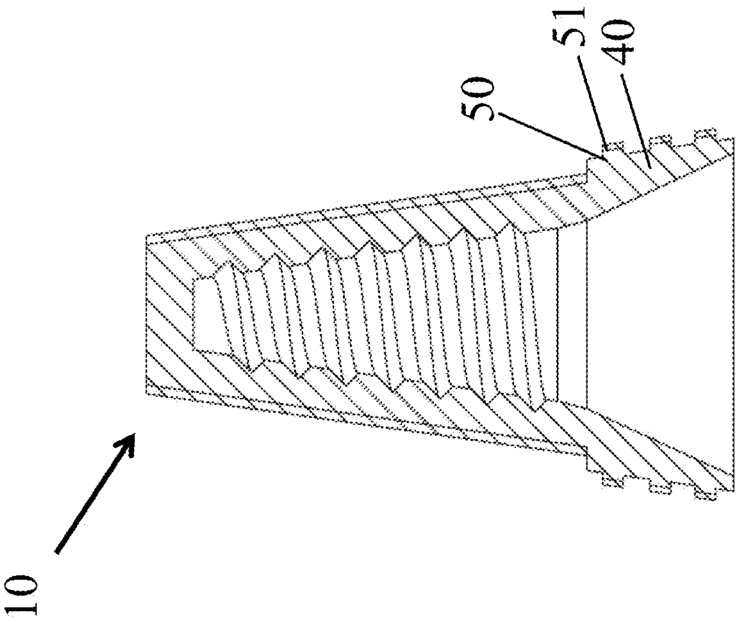
FIG. 11 is a cross section view similar to FIG. 6, but of the wire connector of FIG. 10.
Figure 10:
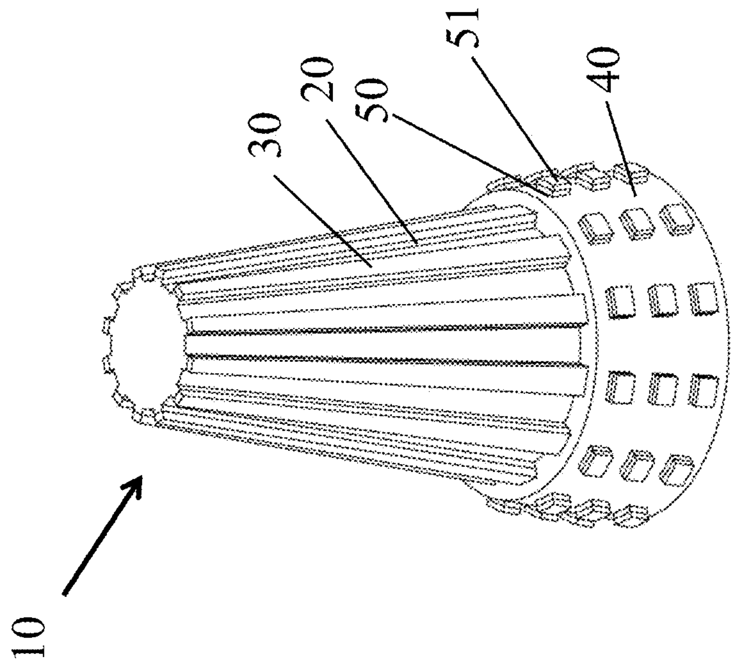
FIG. 10 is a perspective view of a wire connector with coated grip ribs and base grip bumps.
Figure 12:
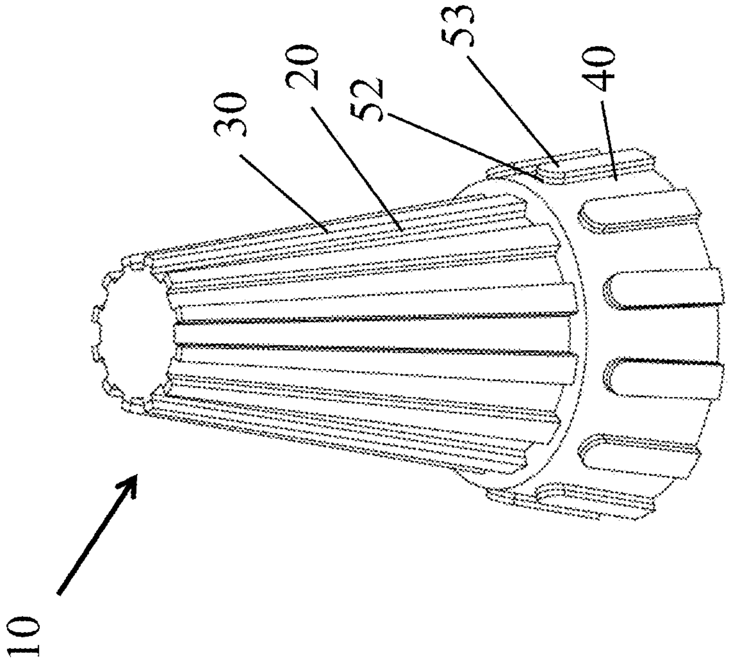
FIG. 12 is a perspective view of a wire connector with coated grip ribs and base ribs.
Figure 13:
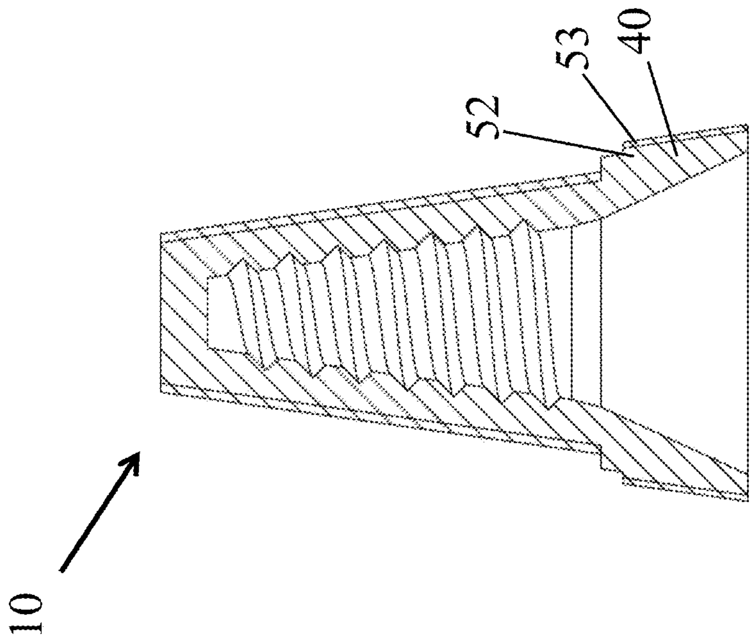
FIG. 13 is a cross section view similar to FIG. 6, but of the wire connector of FIG. 12.
Figure 15:
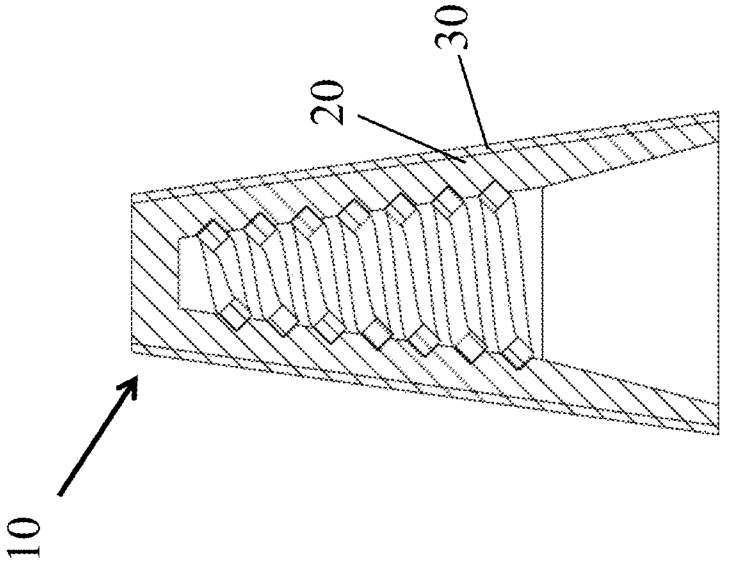
FIG. 15 is a cross section view similar to FIG. 6, but of the wire connector of FIG. 14.
Figure 14:
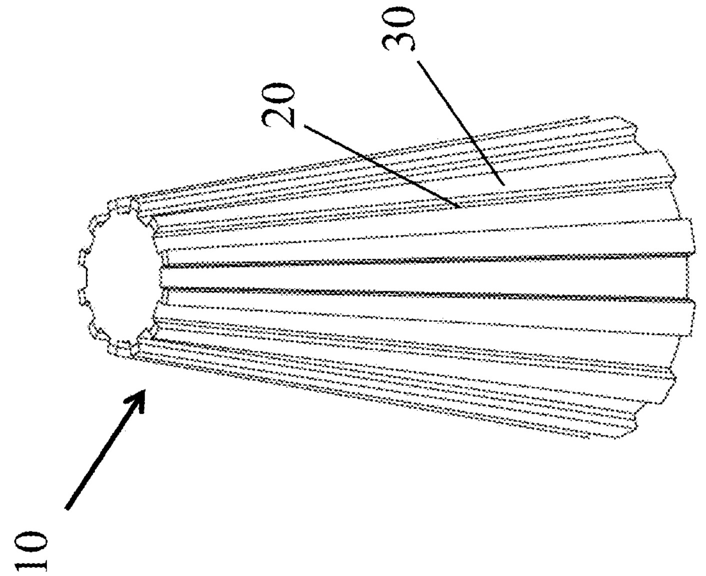
FIG. 14 is a perspective view of a wire connector with full length coated grip grip bumps.
Figure 16:
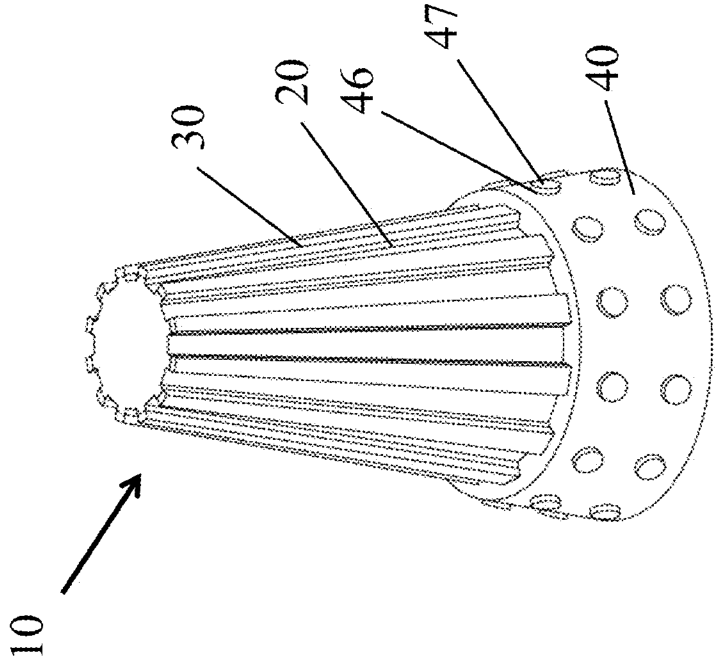
FIG. 16 is a perspective view of a wire connector with circular coated grip grip bumps.
Figure 17:
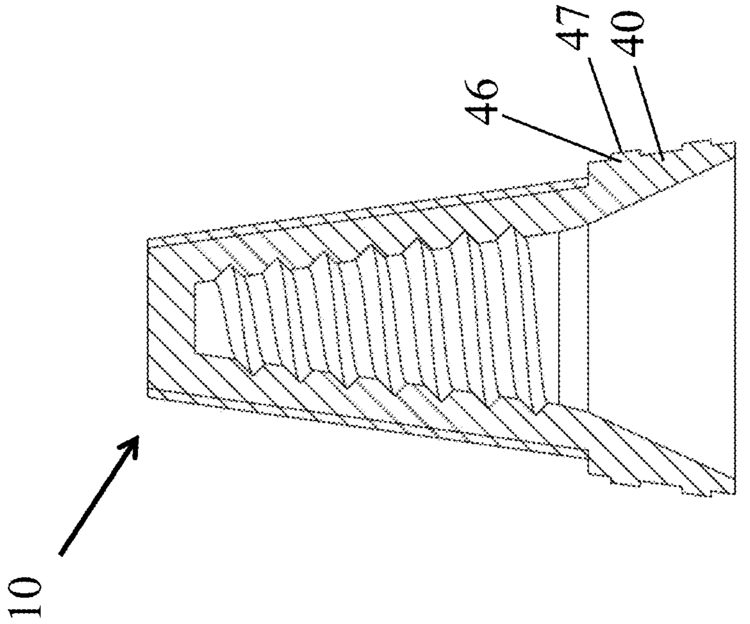
FIG. 17 is a cross section view similar to FIG. 6, but of the wire connector of FIG. 16.
Figure 18:
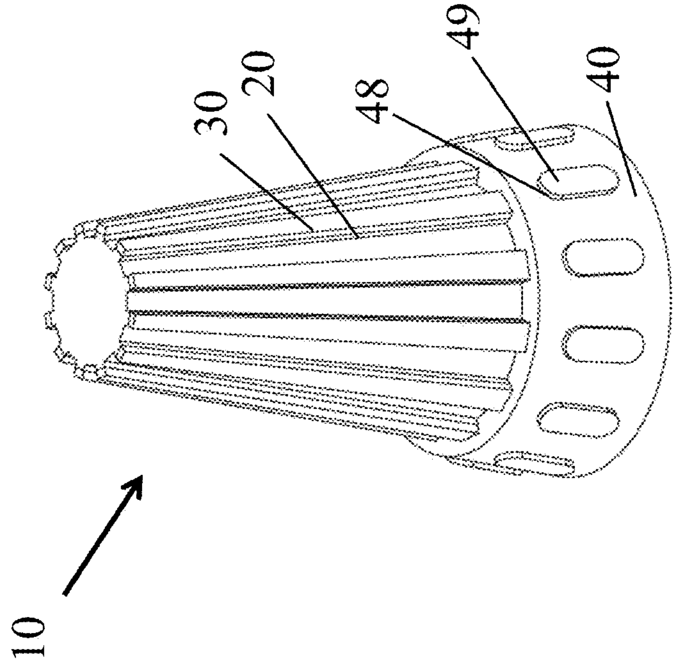
FIG. 18 is a perspective view of a wire connector with oval coated grip grip bumps.
Figure 19:
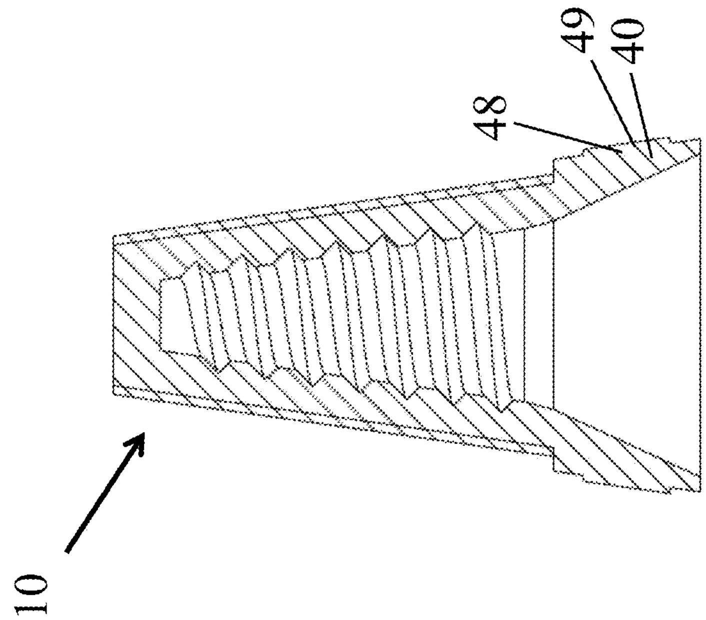
FIG. 19 is a cross section view similar to FIG. 6, but of the wire connector of FIG. 18.
Figure 20:
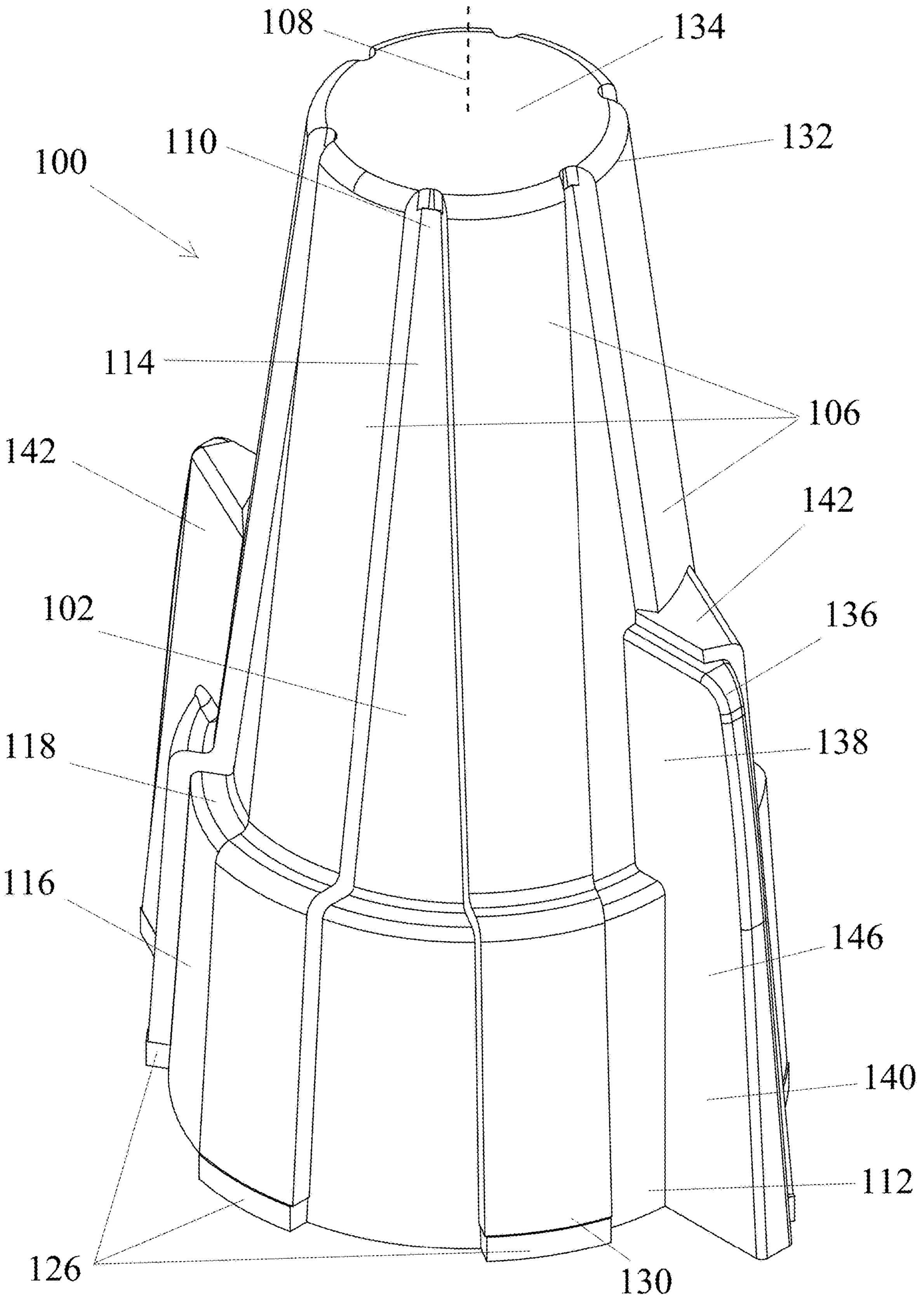
FIG. 20 is a perspective view of a wire connector with a plurality of grip assemblies.

In some embodiments, including the one illustrated in FIGS. 1-7, the wire connector 10 includes an annular base 40 circumscribing the wire connector 10 at the terminal end 36 of the channels. The annular base 40 has a height 42 and a surface 44. To assist a user in gripping the wire connector 10, a texture may be included on the surface 44 of the annular base 40 within its height 42. The texture may be formed in a number of different shapes depending upon the intended design of the wire connector 10. FIGS. 8-9 illustrate an embodiment with no texture on the annular base 40. FIGS. 10-11 illustrate rectangular grip bumps 50 extending outwardly from the surface 44 of the annular base 40. In this embodiment, the rectangular grip bumps 50 are formed in three concentric rows and twelve of columns each aligned with a corresponding raised rib 20. FIGS. 12-13 illustrate elongated rib grip bumps 52 that extend from within the annular base 40 toward the open second end 16 of the outer shell 12. FIGS. 16-19 illustrate elliptical grip bumps 46, 48 in the form of circles in two concentric rows of twelve columns each aligned with a corresponding raised rib 20 (FIGS. 16-17) and ovals in a single row of twelve ovals each aligned with a corresponding raised rib 20 (FIGS. 18-19). Alternatively, any other shape or type of raised texture may be included on the annular base 40 to enhance user grip. FIGS. 14-15 illustrate an embodiment without an annular base so that the channels 22 extend fully from the closed first end 14 to the open second end 16. Although not required for functionality, aligning the raised grip bumps on the annular base 40 may enhance grip and consistency of feel for the user when twisting the wire connector 10.

In some embodiments, including the ones illustrated herein, each of the texture features that extend outwardly from the annular base 40 may further include bump caps 47, 49, 51, 53 that are overmolded onto the respective grip bumps of the various designs. The overmolding occurs proximate the overmolding of the rib caps 30 and uses the same material that the rib caps 30 are formed from. By including overmolded bump caps 47, 49, 51, 53 on the top surfaces of the various grip bumps 46, 48, 50, 52 but not in a bottom surface 68 of a gap 70 between the grip bumps 46, 48, 50, 52, a user's fingers can find purchase against a rigid, uncoated surface of the sides of the grip bumps 46, 48, 50, 52 when needed, in addition to having the comfort of the overmolded bump caps 47, 49, 51, 53.

Particular embodiments, including the embodiment illustrated in FIGS. 1-7, may include two or more leverage wings 54 extending outward at opposing sides of the outer shell 12 to provide additional surfaces through which the user can apply leverage to engage or disengage the wire connector 10 from wire(s) to which the wire connector 10 is attached. Each leverage wing 54 includes a first side 56 and a second side 58. A wing rib 60 may be formed or overmolded on at least the first side 56 of each leverage wing to provide comfort and additional grip to the user's fingers. In particular embodiments, including that illustrated in FIG. 2, the wing rib 60 is positioned along an outer edge of the leverage wings 54. By including a wing rib 60 rather than merely a smooth surface, the user gets additional purchase against the surface of the leverage wing to enhance gripping and twisting power.

In some embodiments, including the embodiment illustrated in FIGS. 1-7, an additional wire skirt 62 may be included around the open second end 16 of the outer shell 12. The skirt may be overmolded proximate the overmolding process of, and of the same material as, the rib caps and bump caps. Alternatively, the wire skirt may be formed separately and adhered to the outer shell 12 through an appropriate adhesive or heat welding or other method known in the art.

Because the skirt is also made of an insulative material softer and more flexible than the substantially rigid material of the outer shell 12, it provides an insulative shelter around the bare ends of wire(s) to which the wire connector is attached, but easily compresses to tightly fit within electrical boxes or other places with limited space. Occasionally, wires are stripped too far when they are prepared for attachment with a wire connector. In such cases, the bare portion of the wire may extend beyond the open end of the wire connector and present a risk of contact with an unintended wire or conductive surface. Additionally, flash-over and arcing is a risk between conductive surfaces that are not insulated from each other. By including an additional wire skirt around the open second end 16 of the outer shell 12, many of these risks can be mitigated. It has been found that a skirt length of between 25-40% of the total length 72 of the wire connector 10 is effective. In other words, if a wire connector 10 has a total length of 1.5", the wire skirt portion of that total length 72 would be between 0.375" and 0.600" long. The insulative thickness 64 of material between 0.010" to 0.050" has also been found to be effective for wire connectors. The additional length added to a wire connector 10 by using a wire skirt 62 also allows use of the wire connectors 10 in a wider variety of wire connecting situations.

FIGS. 20-26 illustrate an embodiment of a wire connector 100. The wire connector 100 is similar to, and may have any of the features of, the wire connector 10 disclosed above. Additionally, any of the individual components of the wire connector 100 may have the same features as similarly named components discussed above with reference to the wire connector 10.

The wire connector 100 has a body 102, a wire cavity 104, and a plurality of grip assemblies 106. The wire cavity 104 is configured to rotatably couple to one or more wires and may have any of the features of the wire cavity 18 disclosed above. The body 102 may have a frustoconical or truncated cone shape, and may have an axis 108, a closed end 110, and an open end 112. The closed end 110 may be opposite the open end 112. The body 102 may be divided into an upper portion 114 and a lower portion 116. The upper portion 114 is adjacent the closed end 110 and the lower portion 116 is adjacent the open end 112. The upper portion 114 and the lower portion 116 may be joined by an annular shelf 118, which may be angled toward the axis 108. The annular shelf 118 may thus have a surface that curves to increase the slope of the annular shelf 118 to be more perpendicular to the axis 108, and a surface that curves to decrease the slope of the annular shelf 118 to be less perpendicular to the axis 108. These surfaces may be relatively sharp corners with small radii of curvature or may curve more gently with larger radii of curvature. In some embodiments, a portion of the annular shelf 118 is a surface that is perpendicular to the axis 108.

Figure 21:
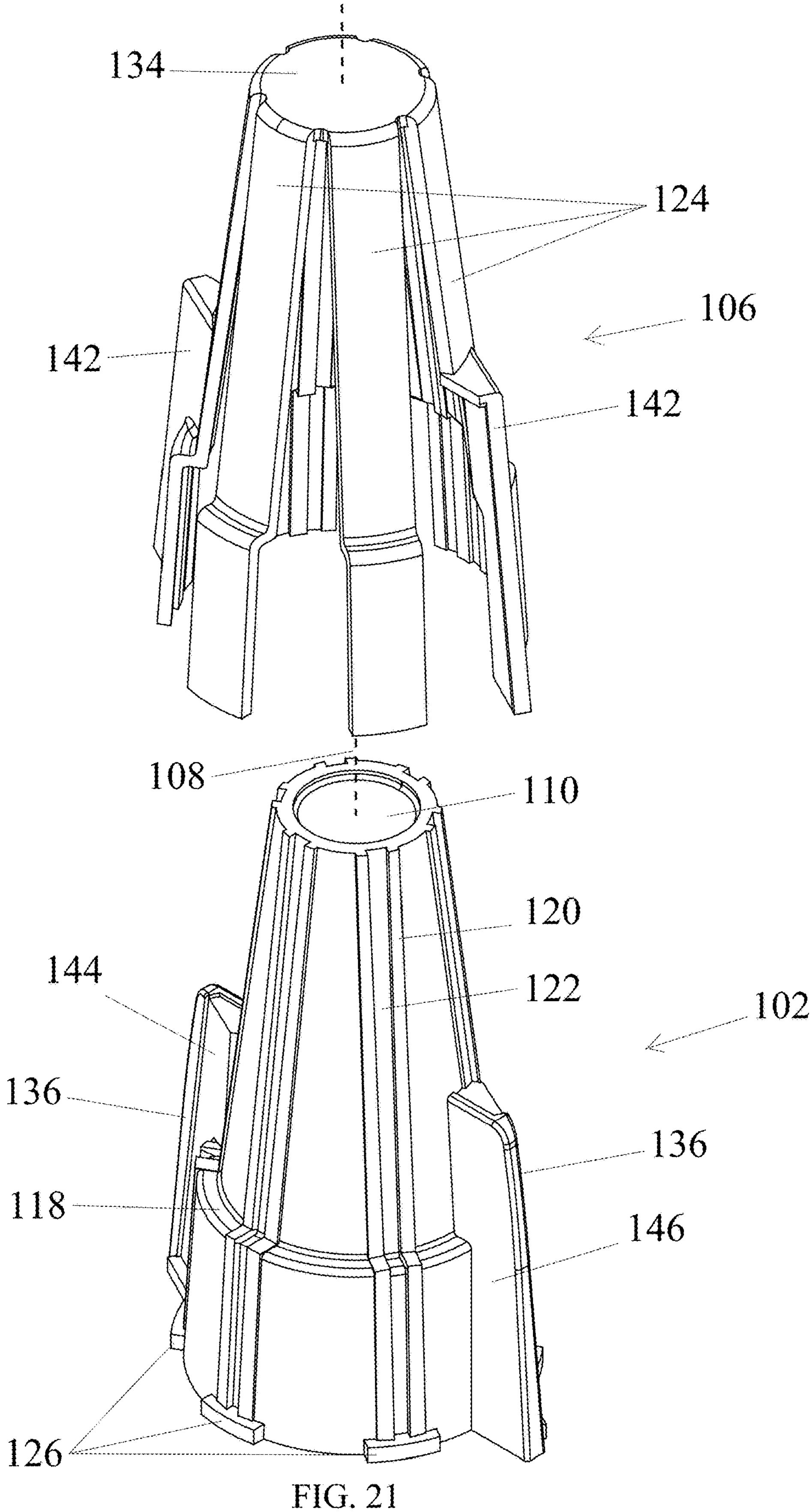
FIG. 21 is an exploded view of the wire connector shown in FIG. 20.
Figure 22:
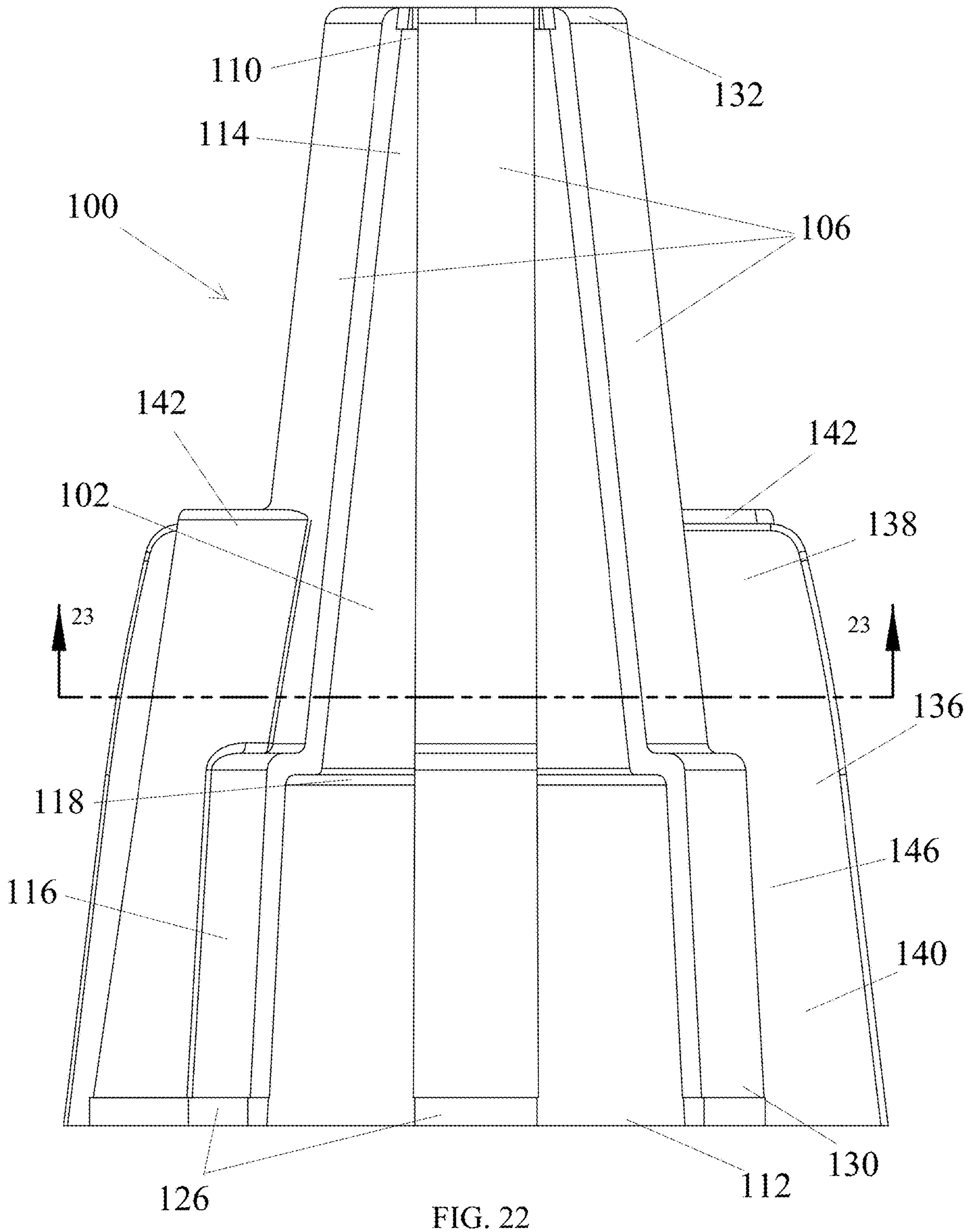
FIG. 22 is a front view of the wire connector shown in FIG. 20.
Figure 23:
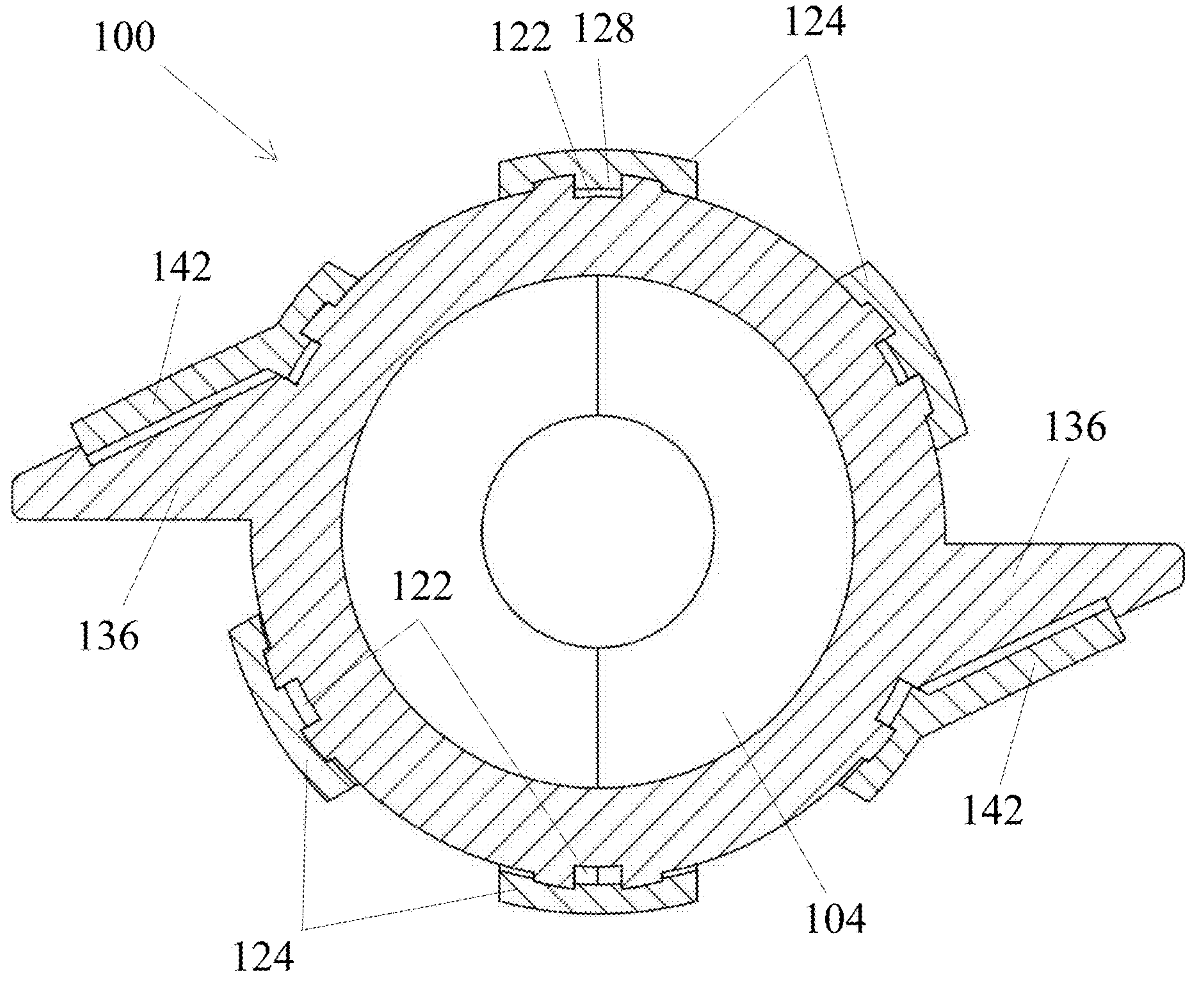
FIG. 23 is a section view of the wire connector, taken from line 23-23 in FIG. 22.
Figure 24:
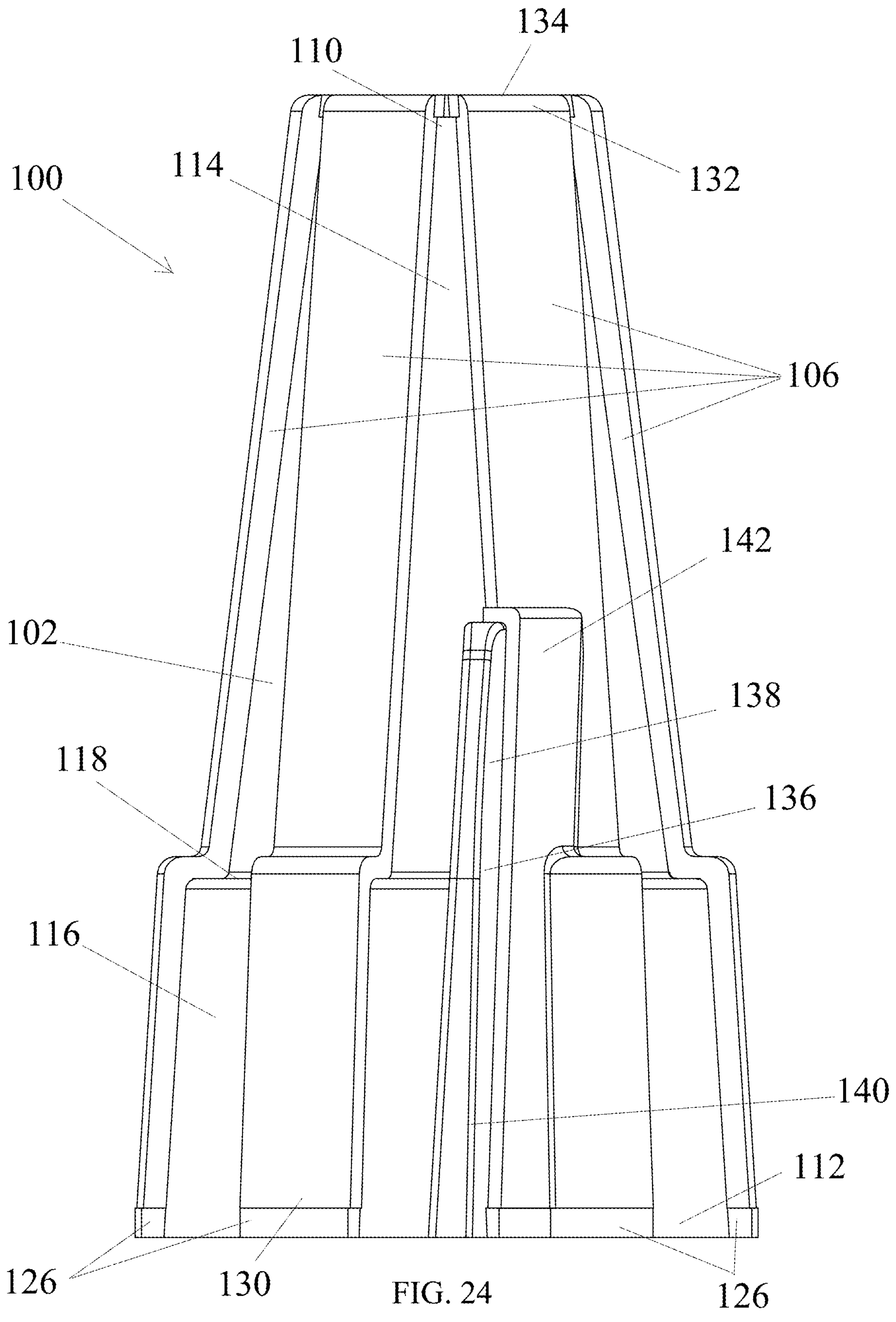
FIG. 24 is a side view of the wire connector shown in FIG. 20.
Figure 25:
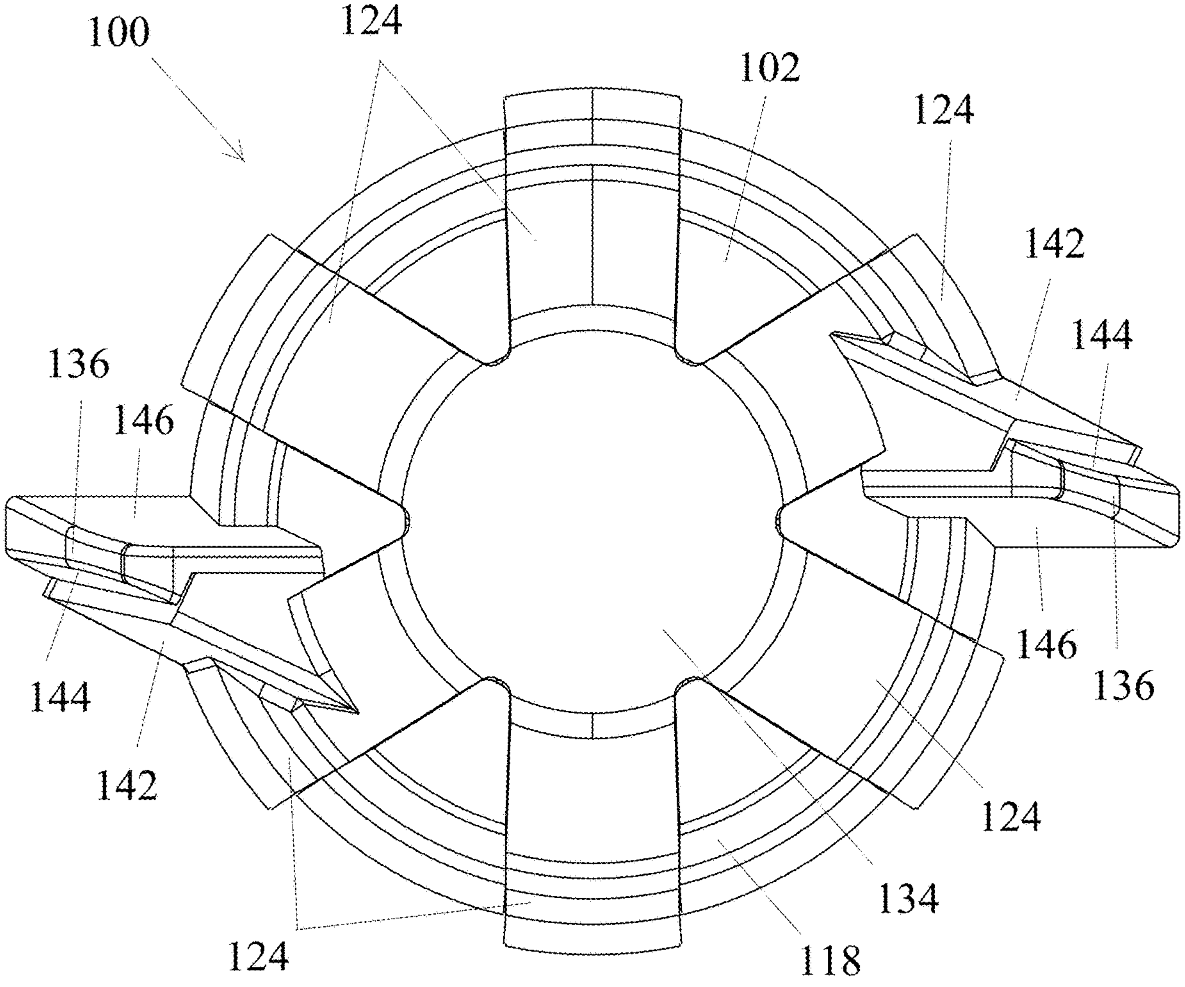
FIG. 25 is a top view of the wire connector shown in FIG. 20.
Figure 26:
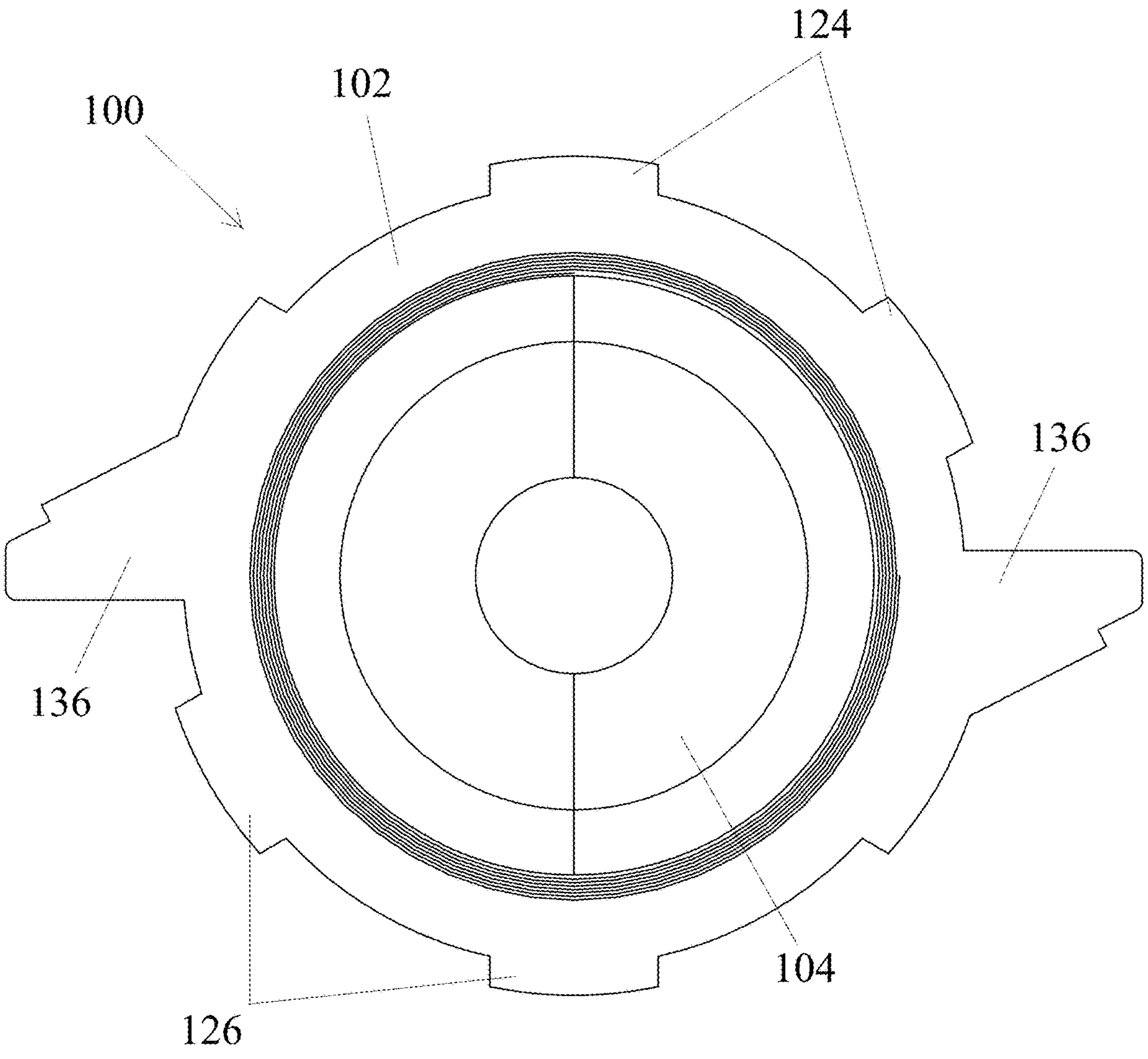
FIG. 26 is a bottom view of the wire connector shown in FIG. 20.

The plurality of grip assemblies 106 may be positioned around a circumference of the body 102, and may be spaced equally apart around the body 102. Each of the grip assemblies may comprise a raised rib 120, a groove 122 extending into the raised rib 120, a rib cap 124, and a base 126. The raised rib 120 may be formed integrally with and from the same material as the body 102 of the wire connector 100. The raised rib 120 extends between the closed end 110 and the open end 112 of the body 102. In some embodiments, the raised rib 120 is coplanar with the axis 108. Thus, in such an embodiment, as the raised rib 120 extends from the closed end 110 to the open end 112, each point along the raised rib 120 is at the same angular position on the body 102, and the raised rib 120 does not wrap around the body 102 in either direction. As mentioned above, the groove 122 extends into the raised rib 120, and may extend radially into the raised rib 120. The groove 122 may be parallel with the raised rib 120. As shown in FIGS. 21 and 23, the groove 122 therefore divides the raised rib 120 into two sides. In some embodiments, the two sides of the raised rib 120 may have the same size, but in other embodiments, the groove 122 may not extend along the center of the raised rib 120, and thus the two sides of the raised rib 120 may not be the same size.

The rib cap 124 is shaped and positioned to cover the raised rib 120, as shown in FIG. 23. For example, the rib cap 124 may cover the front face and sides of the raised rib 120. The rib cap 124 may also be shaped and positioned to extend into the groove 122, as shown in FIG. 23. By extending the rib cap 124 into the groove 122, the rib cap 124 is more securely coupled to the raised rib 120, thus providing more leverage and a greater capacity for applying torque to the wire connector 100. The rib cap 124 may have a tongue 128 which extends along a length of the rib cap 124 and is configured to extend into the groove 122. The tongue 128 may fill the groove 122 such that no empty space is left in the groove 122. Alternatively, the tongue 128 may extend into the groove 122 without completely filling the groove 122.

The rib cap 124 has a first end 130 and a second end 132 opposite the first end 130. The first end 130 may be adjacent the open end 112 of the body 102 and the second end 132 may be adjacent the closed end 110 of the body 102. The base 126 of the grip assembly 106 may extend radially away from the body 102 adjacent to the open end 112 of the body 102. The base 126 is configured to cover the first end 130 of the rib cap 124. This helps to retain the rib cap 124 in its position on the raised rib 120 because the first end 130 of the rib cap 124 is less likely to catch on another object when the first end 130 is covered by the base 126. The second end 132 of the rib cap 124 may be joined to an end cap 134 that is positioned to cover the closed end 110 of the body 102. As shown in FIG. 21, this unifies each of the rib caps 124 into one piece that is positioned over the body 102.

The wire connector 100 may also have a plurality of leverage wings 136. The wire connector 100 may have at least two leverage wings 136. The leverage wings 136 provide additional surfaces that may be used to grip and rotate the wire connector 100 to couple the wire connector 100 with one or more wires. The leverage wings 136 may extend outward from the body 102, and may do so on opposing sides of the body 102. The leverage wings 136 may extend from the body 102 in the upper portion 114 and/or in the lower portion 116. In embodiments that extend away from the body 102 in both the upper portion 114 and in the lower portion 116, each leverage wing 136 may have an upper section 138 that extends from the upper portion 114 and a lower section 140 that extends from the lower portion 116. Each leverage wing 136 may have a wing cap 142 that is positioned to cover a portion of a first side 144 of the leverage wing 136 and leave a second side 146 of the leverage wing 136 exposed. Similar to the rib caps 124, this provides additional grip to the user. Leaving a portion of the leverage wing 136 exposed helps to limit the amount of material needed to form the wing cap 142.

The wire connector 100 may have any number of grip assemblies 106. While the figures illustrate an embodiment with six grip assemblies 106, any other number may be implemented. The grip assemblies 106 provide increased grip on the body 102 to the user by providing ribs 120 that extend out of the body 102 and are covered by the rib cap 124 that is formed of a material that may be configured to provide greater friction between the wire connector 100 and the user. Each of the rib caps 124, the wing caps 142, and the end cap 134 may be formed of one piece, and may be of a material more flexible than the material which the body 102 is formed of. In a particular embodiment, the rib caps 124, the wing caps 142, and the end cap 134 are overmolded onto the raised ribs 120 of the body 102 using standard overmolding processes used for overmolding materials onto selective areas of plastic. The overmolding materials for the rib caps 124, the wing caps 142, and the end cap 134 found advantageous for providing enhanced grip includes any of rubber, silicone, urethane, synthetic rubbers and fluoropolymer elastomers such as those manufactured by DuPont® under the trademark Viton®, ethylene propylene diene monomer (EPDM) rubber, and thermoplastic elastomers such as neoprene and santoprene.

It will be understood that implementations of wire connectors are not limited to the specific configurations, assemblies, devices and components disclosed in this document, as virtually any assemblies, devices and components consistent with the intended operation of wire connectors may be modified according to the principles discussed herein. Accordingly, for example, although particular wire connectors, and other assemblies, devices and components are disclosed, such may include any shape, size, style, type, model, version, class, measurement, concentration, material, weight, quantity, and/or the like consistent with the intended operation of wire connectors. Implementations are not limited to uses of any specific assemblies, devices and components; provided that the assemblies, devices and components selected are consistent with the intended operation of wire connectors.

Accordingly, the components defining any wire connector implementations may be formed of any of many different types of materials or combinations thereof that can readily be formed into shaped objects provided that the components selected are consistent with the intended operation of a wire connector implementation. For example, the components may be formed of: polymers such as thermoplastics (such as ABS, Fluoropolymers, Polyacetal, Polyamide; Polycarbonate, Polyethylene, Polysulfone, and/or the like), thermosets (such as Epoxy, Phenolic Resin, Polyimide, Polyurethane, Silicone, and/or the like), any combination thereof, and/or other like materials; glasses (such as quartz glass), carbon-fiber, aramid-fiber, any combination thereof, and/or other like materials; composites and/or other like materials; metals, such as zinc, magnesium, titanium, copper, lead, iron, steel, carbon steel, alloy steel, tool steel, stainless steel, brass, nickel, tin, antimony, pure aluminum, 1100 aluminum, aluminum alloy, any combination thereof, and/or other like materials; alloys, such as aluminum alloy, titanium alloy, magnesium alloy, copper alloy, any combination thereof, and/or other like materials; any other suitable material; and/or any combination of the foregoing thereof. In instances where a part, component, feature, or element is governed by a standard, rule, code, or other requirement, the part may be made in accordance with, and to comply under such standard, rule, code, or other requirement.

Various wire connectors may be manufactured using conventional procedures as added to and improved upon through the procedures described here. Some components defining wire connectors may be manufactured simultaneously and integrally joined with one another, while other components may be purchased pre-manufactured or manufactured separately and then assembled with the integral components. Various implementations may be manufactured using conventional procedures as added to and improved upon through the procedures described here.

Accordingly, manufacture of these components separately or simultaneously may involve extrusion, pultrusion, vacuum forming, injection molding, blow molding, resin transfer molding, casting, forging, cold rolling, milling, drilling, reaming, turning, grinding, stamping, cutting, bending, welding, soldering, hardening, riveting, punching, plating, and/or the like. If any of the components are manufactured separately, they may then be coupled with one another in any manner, such as with adhesive, a weld, a fastener (e.g. a bolt, a nut, a screw, a nail, a rivet, a pin, and/or the like), wiring, any combination thereof, and/or the like for example, depending on, among other considerations, the particular material forming the components.

It will be understood that the methods involving wire connectors are not limited to the specific order of steps as disclosed in this document. Any steps or sequence of steps of the assembly of wire connectors indicated herein are given as examples of possible steps or sequence of steps and not as limitations, since various assembly processes and sequences of steps may be used to assemble them.

The implementations of the wire connectors described are by way of example or explanation and not by way of limitation. Rather, any description relating to the foregoing is for the exemplary purposes of this disclosure, and implementations may also be used with similar results for a variety of other applications.

What is claimed is:

1. A wire connector comprising:

a body having a closed end and an open end;

a wire cavity within the open end of the body configured to rotatably couple to one or more wires; and a plurality of grips coupled to the body, each of the grips comprising a raised rib extending from the body and at least part of a length between the closed end and the open end, a groove extending radially into the raised rib, and a rib cap having a length and shaped and positioned to cover the raised rib and extend into the groove, the rib cap having a first end adjacent the open end of the body and a second end adjacent the closed end of the body, wherein the second end of the rib cap of each grip is joined to an end cap positioned to cover the closed end of the body;

wherein each rib cap is separated from adjacent rib caps by a gap extending for a majority of its length, the gap exposing a portion of the body between adjacent raised ribs.

2. The wire connector of claim 1, wherein the plurality of grips is positioned around a circumference of the body.

3. The wire connector of claim 1, wherein the groove of each grip is aligned with the raised rib of each grip.

4. The wire connector of claim 1, wherein each rib cap and the end cap are formed as one piece.

5. The wire connector of claim 1, wherein each rib cap is formed from a material more flexible than a material of the body.

6. The wire connector of claim 1, wherein the rib cap of each grip has a first end adjacent the open end of the body and a second end adjacent the closed end of the body and wherein each grip further comprises a base extending radially away from the body adjacent the open end of the body, the base configured to cover the first end of the rib cap.

7. The wire connector of claim 1, wherein the body is divided into an upper portion adjacent the closed end and a lower portion adjacent the open end and the lower portion is joined to the upper portion by an annular shelf.

8. The wire connector of claim 1, further comprising at least two leverage wings extending outward from the body on opposing sides of the body, wherein each leverage wing of the at least two leverage wings has a wing cap positioned to cover a portion of a first side of the leverage wing and leave a second side of the leverage wing exposed.

9. The wire connector of claim 8, wherein the body is defined by an upper portion adjacent the closed end and a lower portion adjacent the open end, wherein the lower portion is separated from the upper portion by an annular shelf, and wherein an upper section of each leverage wing extends outward from the upper portion of the body and a lower section of each leverage wing extends outward from the lower portion of the body.

10. The wire connector of claim 1, wherein each rib cap has a tongue that extends into and fills the groove in its corresponding raised rib.

11. A wire connector comprising:

a body having a closed end and an open end and a plurality of raised ribs extending from the body and at least part of a length between the closed end and the open end, each raised rib separated from each adjacent raised rib of the plurality of raised ribs by a channel having two side walls and a bottom wall, each of the side walls and bottom wall extending for a length of the raised rib;

a wire cavity within the open end of the body configured to rotatably couple to one or more wires; and a plurality of rib caps comprising at least one rib cap disposed over a surface of the body at each of the plurality of raised ribs, wherein each rib cap is shaped and positioned to cover a portion of a corresponding raised rib and extend into a groove in that corresponding raised rib of the plurality of raised ribs, wherein each rib cap has a first end adjacent the open end of the body and a second end adjacent the closed end of the body and wherein the second end of each rib cap is joined to an end cap positioned to cover the closed end of the body, wherein each rib cap is separated from adjacent rib caps of the plurality of rib caps by a gap extending for a majority of its length, the gap located in the channel between adjacent raised ribs.

12. The wire connector of claim 11, wherein each rib cap has a tongue that extends into and fills the groove in its corresponding raised rib.

13. The wire connector of claim 11, wherein the groove in each raised rib is parallel with the raised rib.

14. The wire connector of claim 11, wherein each rib cap and the end cap are formed as one piece.

15. The wire connector of claim 11, wherein each rib cap is formed from a material more flexible than a material of the body.

16. The wire connector of claim 11, wherein each rib cap has a first end adjacent the open end of the body and a second end adjacent the closed end of the body and wherein the body further comprises a plurality of rib cap bases extending radially away from the body adjacent the open end of the body, and each rib cap base of the plurality of rib cap bases configured to cover the first end of a corresponding rib cap.

17. The wire connector of claim 11, wherein the body is divided into an upper portion adjacent the closed end and a lower portion adjacent the open end and the lower portion is joined to the upper portion by an annular shelf.

18. The wire connector of claim 11, further comprising at least two leverage wings extending outward from the body on opposing sides of the body, wherein each leverage wing of the at least two leverage wings has a wing cap positioned to cover a portion of a first side of the leverage wing and leave a second side of the leverage wing exposed.

19. The wire connector of claim 18, wherein the body is defined by an upper portion adjacent the closed end and a lower portion adjacent the open end, wherein the lower portion is separated from the upper portion by an annular shelf, and wherein an upper section of each leverage wing extends outward from the upper portion of the body and a lower section of each leverage wing extends outward from the lower portion of the body.

20. The wire connector of claim 11, wherein the body has an axis and each raised rib is coplanar with the axis.

* * * * *